(12) United States Patent
Kermiche et al.

(10) Patent No.: US 8,681,445 B1
(45) Date of Patent: Mar. 25, 2014

(54) DISK DRIVE DETECTING HEAD TOUCHDOWN BY COMPUTING ANTI-CORRELATION IN SENSOR SIGNAL

(75) Inventors: Noureddine Kermiche, Dana Point, CA (US); Xianghui Xiao, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/536,305

(22) Filed: Jun. 28, 2012

(51) Int. Cl.
*G11B 5/00* (2006.01)

(52) U.S. Cl.
USPC .......................................................... 360/55

(58) Field of Classification Search
None
See application file for complete search history.

(56) References Cited

U.S. PATENT DOCUMENTS

| | | | |
|---|---|---|---|
| 5,168,413 A | 12/1992 | Coker et al. | |
| 7,016,139 B2 | 3/2006 | Baumgart et al. | |
| 7,158,325 B1 | 1/2007 | Hu et al. | |
| 7,233,451 B2 | 6/2007 | Baumgart et al. | |
| 7,508,618 B1 | 3/2009 | Herbst et al. | |
| 7,583,466 B2 | 9/2009 | Kermiche et al. | |
| 7,605,996 B2 | 10/2009 | Baumgart et al. | |
| 7,660,068 B1 | 2/2010 | Baumgart et al. | |
| 7,796,356 B1 | 9/2010 | Fowler et al. | |
| 7,830,634 B2 | 11/2010 | Chen et al. | |
| 8,059,357 B1 | 11/2011 | Knigge et al. | |
| 8,085,490 B2 | 12/2011 | Franca-Neto et al. | |
| 2007/0253092 A1* | 11/2007 | Ikai et al. | 360/75 |
| 2009/0257145 A1 | 10/2009 | Tsuyama | |
| 2010/0157454 A1 | 6/2010 | Chen et al. | |
| 2010/0225310 A1 | 9/2010 | Sudou | |
| 2010/0259850 A1 | 10/2010 | Miyake et al. | |
| 2011/0157736 A1 | 6/2011 | Contreras et al. | |
| 2011/0235207 A1 | 9/2011 | Yang | |
| 2012/0002319 A1 | 1/2012 | Kondo | |
| 2012/0120982 A1 | 5/2012 | Anaya-Dufresne et al. | |
| 2012/0201108 A1 | 8/2012 | Zheng et al. | |
| 2012/0218659 A1 | 8/2012 | Liu et al. | |
| 2013/0094107 A1 | 4/2013 | Setiadi et al. | |

OTHER PUBLICATIONS

Bernhard Knigge, Barry Stipe, Robert Payne, Peter Baumgart, "Write Protrusion Modulation for Sub-Nanometer Contact Interference", Proceedings of WTC 2005, 2005 World Tribology Congress III, Washington, D.C., Sep. 12-16, 2005.

* cited by examiner

*Primary Examiner* — Wayne Young
*Assistant Examiner* — Brian Butcher

(57) ABSTRACT

A disk drive is disclosed comprising a head actuated over a disk, a dynamic fly height (DFH) actuator operable to control a fly height of the head over the disk, and a touchdown (TD) sensor operable to generate a TD signal. A periodic control signal is applied to the DFH actuator to generate a periodic response in the TD signal comprising at least one cycle, wherein the cycle comprises a first half cycle and a second half cycle. An anti-correlation is computed between the first half cycle and the second half cycle of the TD signal, and the head contacting the disk is detected in response to the anti-correlation.

18 Claims, 4 Drawing Sheets

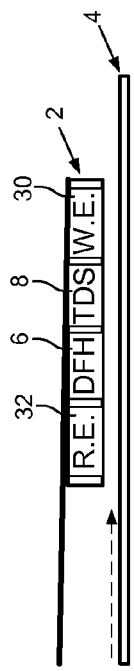
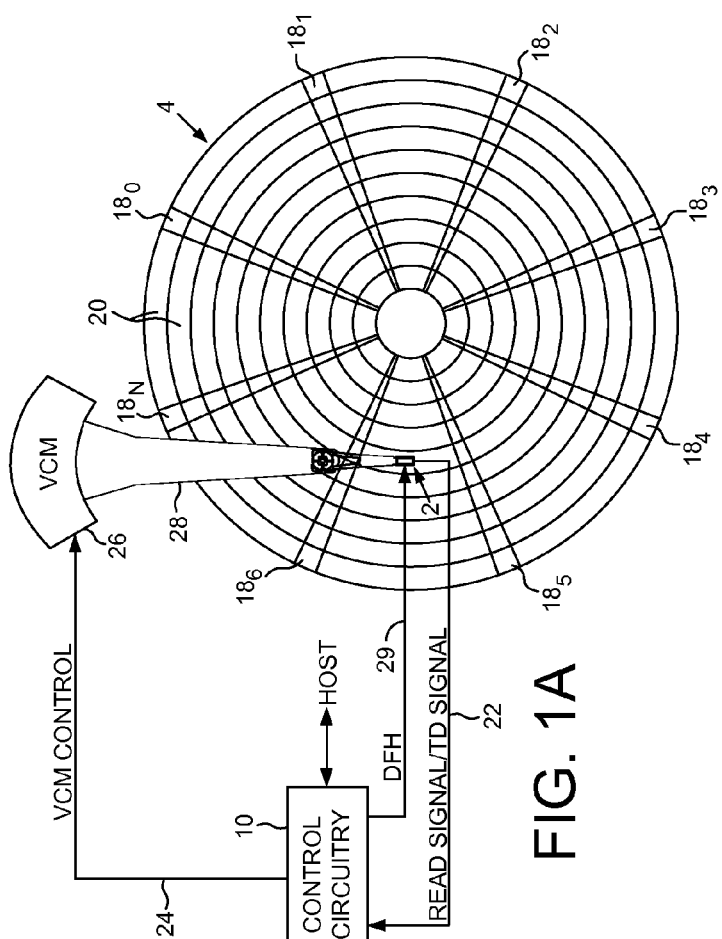
FIG. 1A
FIG. 1B
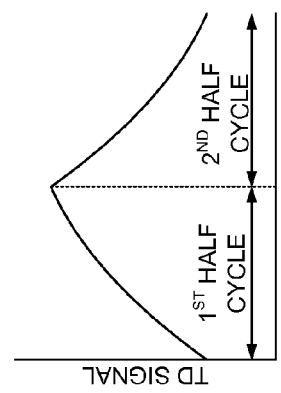
FIG. 1C
FIG. 1D

DISK DRIVE DETECTING HEAD TOUCHDOWN BY COMPUTING ANTI-CORRELATION IN SENSOR SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable dynamic fly height (DFH) actuator may be employed, such as a heater which controls fly height through thermal expansion, or a piezoelectric (PZT) actuator. It is desirable to determine the appropriate DFH setting (e.g., appropriate current applied to a heater) that achieves the target fly height for the head.

BRIEF DESCRIPTION OF THE DRAWINGS

FIG. 1A shows a disk drive according to an embodiment of the present invention comprising a head actuated over a disk.

FIG. 1B shows a head actuated over the disk comprising a write element (WE), a read element (RE), a dynamic fly height (DFH) actuator, and a touch down (TD) sensor.

FIG. 1C is a flow diagram according to an embodiment of the present invention wherein a periodic control signal is applied to the DFH actuator and an anti-correlation computed in the TD signal generated by the TD sensor according to an embodiment of the present invention.

FIG. 1D illustrates an embodiment of the present invention wherein the anti-correlation is computed between a first half cycle and a second half cycle of the TD signal.

DETAILED DESCRIPTION

Figure 2:
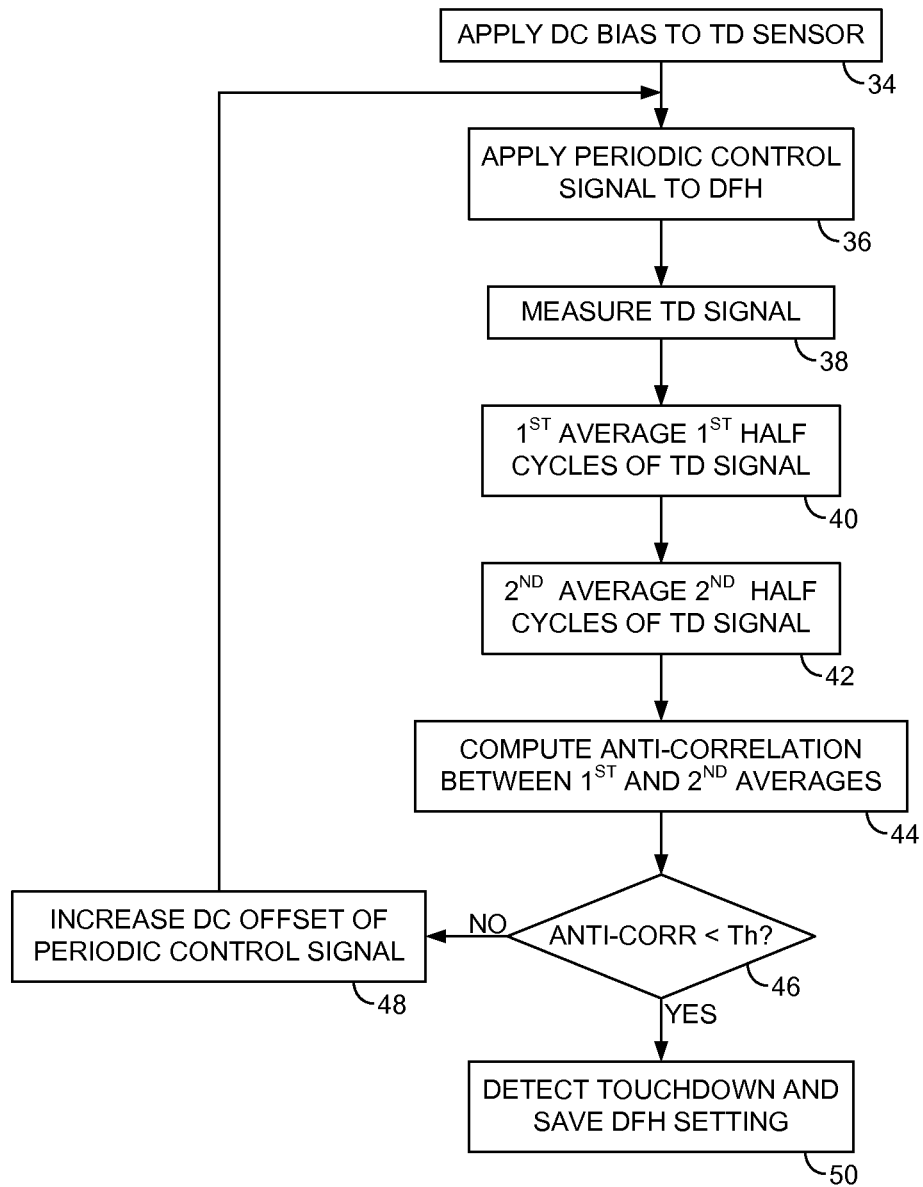
FIG. 2 is a flow diagram according to an embodiment of the present invention wherein a DC offset of the periodic control signal is increased until the anti-correlation indicates a head touchdown event.

FIG. 1A shows a disk drive according to an embodiment of the present invention comprising a head 2 actuated over a disk 4. The disk drive further comprises a dynamic fly height (DFH) actuator 6 operable to control a fly height of the head 2 over the disk 4, and a touchdown (TD) sensor 8 operable to generate a TD signal, wherein in an embodiment shown in FIG. 1B, the DFH actuator 6 and TD sensor 8 are fabricated with the head 2. Control circuitry 10 in the disk drive is operable to execute the flow diagram of FIG. 1C, wherein a periodic control signal is applied to the DFH actuator (block 12) to generate a periodic response in the TD signal (block 14) comprising at least one cycle, wherein the cycle comprises a first half cycle and a second half cycle as shown in FIG. 1D. An anti-correlation is computed between the first half cycle and the second half cycle of the TD signal (block 16), and the head contacting the disk is detected in response to the anti-correlation.

In the embodiment of FIG. 1A, the disk 4 comprises embedded servo sectors $18_0$-$18_N$ that define a plurality of tracks 20. The control circuitry 10 processes a read signal 22 emanating from the head 2 to demodulate the servo sectors $18_0$-$18_N$ and generate a position error signal (PES) representing an error between the actual position of the head and a target position relative to a target track. The control circuitry 10 filters the PES using a suitable compensation filter to generate a control signal 24 applied to a voice coil motor (VCM) 26 which rotates an actuator arm 28 about a pivot in order to actuate the head 2 radially over the disk in a direction that reduces the PES. The servo sectors $18_0$-$18_N$ may comprise any suitable position information, such as a track address for coarse positioning and servo bursts for fine positioning. The servo bursts may comprise any suitable pattern, such as the amplitude-based servo pattern (e.g., a quadrature servo pattern), or a suitable phase-based servo pattern.

Any suitable DFH actuator 6 may be employed in the embodiments of the present invention, such as a heater which controls fly height through thermal expansion, or a piezoelectric (PZT) actuator. In addition, the periodic control signal 29 applied to the DFH actuator 6 may comprise any suitable signal, such as a current or a voltage applied to the DFH actuator 6. In one embodiment, an operating DFH setting is determined for the disk drive relative to the DFH setting that causes the head to contact the disk surface (touchdown). The accuracy of the operating DFH setting is therefore dependent on the accuracy of the TD detection.

The head 2 shown in the embodiment of FIG. 1B comprises a write element (WE) 30 and a read element (RE) 32, as well as a separate TD sensor 8. In one embodiment, the read element 32 and the TD sensor 8 comprise a magnetoresistive (MR) element having a resistance that varies relative to the magnetic field emanating from the disk. In addition, the resistance of an MR element may vary relative to temperature, and therefore the TD signal emanating from the TD sensor 8 may represent the thermal response of the TD sensor 8 when applying the periodic control signal to a DFH heater actuator 6. This is illustrated in FIG. 1D wherein after applying a DC bias to the TD sensor 8, the resistance of the TD sensor 8 is measured, for example, by measuring the voltage across the TD sensor 8. During the first half cycle the periodic control signal applied to the DFH heater actuator 6 is increased (e.g., "on time" of a square wave) thereby heating the TD sensor 8 resulting in an exponential increase in its resistance. During the second half cycle the periodic control signal applied to the DFH heater actuator 6 is decreased (e.g., "off time" of a square wave) thereby cooling the TD sensor 8 resulting in an exponential decrease in its resistance. While the head is flying above the disk (not touching down), the exponential increase in the TD signal during the first half cycle will substantially anti-correlate with the exponential decrease in the TD signal during the second half cycle. As described in greater detail below, this anti-correlation between the first half cycle and the second half cycle of the TD signal will break down when the head contacts the disk, thereby providing a good indication of a touchdown event.

FIG. 2 is a flow diagram according to an embodiment of the present invention for detecting a head touchdown event, wherein a DC bias (e.g., a bias current) is applied to the TD sensor (block 34). A periodic control signal is applied to the DFH actuator (block 36), and the TD signal is measured over a plurality of cycles of the periodic control signal (block 38). The first half cycles over the plurality of cycles of the TD signal are first averaged (block 40), and the second half cycles over the plurality of cycles of the TD signal are second averaged (block 42) in order to filter noise from the TD signal measurement. The anti-correlation between the first and second averages is then computed (block 44) and the anti-correlation compared to a threshold (block 46). If the anti-correlation is greater than the threshold, a DC offset of the periodic control signal applied to the DFH actuator is increased (block 48), and the flow diagram is repeated from block 36 until the anti-correlation falls below the threshold at block 46. When the anti-correlation falls below the threshold, a touchdown even is detected and a corresponding DFH setting (e.g., DC offset of periodic control signal) is saved (block 50).

Figure 3A:
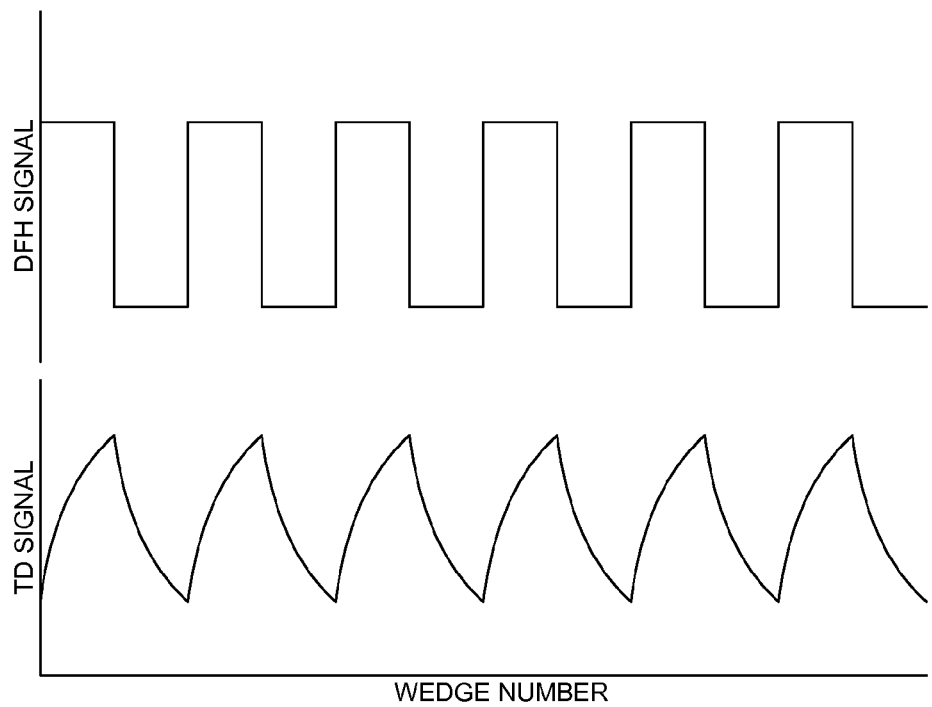
FIG. 3A shows the periodic control signal applied to the DFH actuator and the resulting TD signal prior to the head touchdown event according to an embodiment of the present invention.

FIG. 3A illustrates an embodiment of the present invention wherein a periodic control signal (square wave) is applied to the DFH actuator while the head is flying above the disk (not touching down). The resulting TD signal comprises a number of cycles wherein the resistance of the TD sensor is exponentially increasing during the first half of each cycle and exponentially decreasing during the second half of each cycle. Since the head is flying above the disk, the TD signal represents the thermal response of the TD sensor with a high anti-correlation between the first half cycle (heating response) and the second half cycle (cooling response).

Figure 3B:
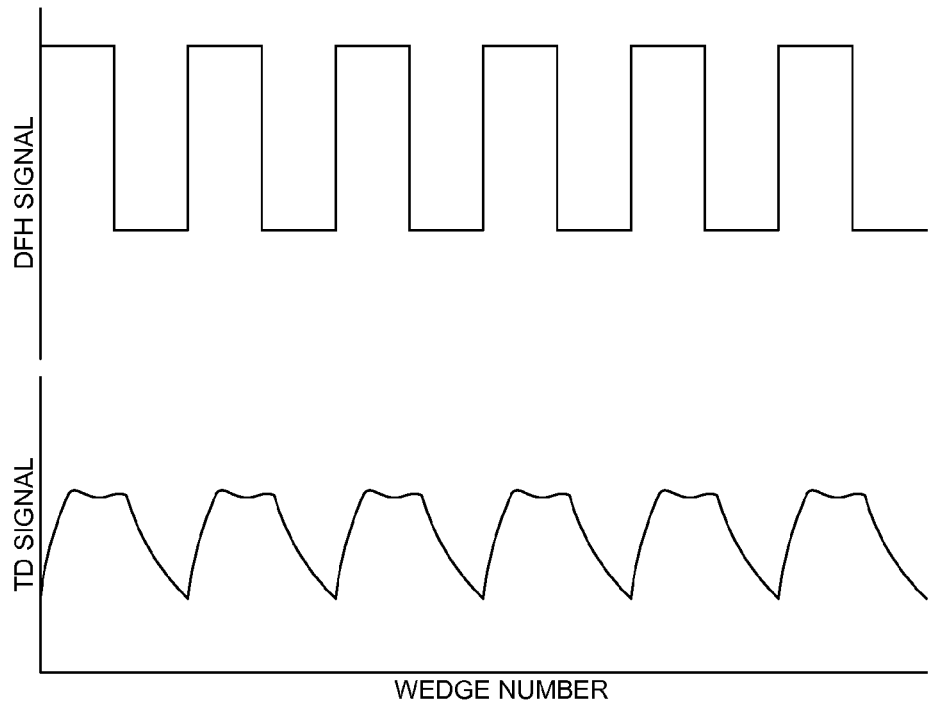
FIG. 3B shows the periodic control signal applied to the DFH actuator and the resulting TD signal during the head touchdown event according to an embodiment of the present invention.
Figure 4:
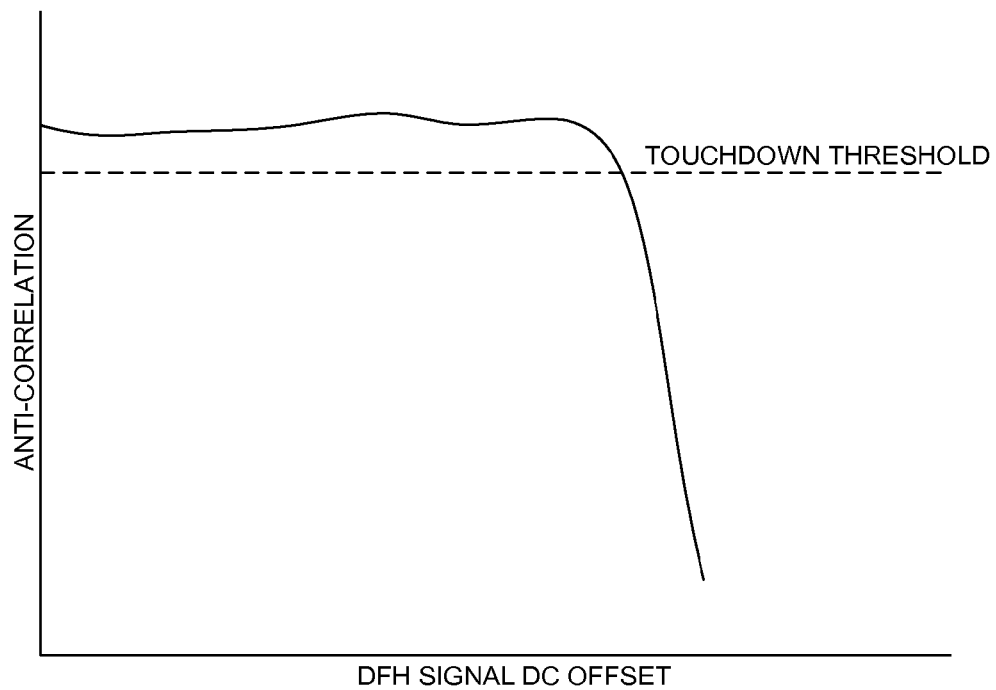
FIG. 4 shows an embodiment of the present invention wherein the head touchdown event is detected when the anti-correlation falls below a threshold.

FIG. 3B illustrates an embodiment of the present invention wherein the DC offset of the periodic control signal applied to the DFH actuator has been increased to the point where the head is contacting the disk (touchdown). The resulting TD signal will distort as shown in FIG. 3B as the head contacts the disk (with the thermal expansion effect of the DFH actuator). Consequently, the anti-correlation between the first half cycle and the second half cycle of the TD signal will break down as illustrated in FIG. 4. In one embodiment, the anti-correlation is compared to a touchdown threshold, and a touchdown event is detected when the anti-correlation falls below the touchdown threshold (due to increasing the DC offset of the periodic control signal applied to the DFH actuator).

The periodic control signal applied to the DFH actuator may comprise any suitable period. In the embodiment shown in FIGS. 3A and 3B, the periodic control signal comprises six cycles over one revolution of the disk. In addition, the anti-correlation may be computed using any suitable filtering technique, such as averaging the first and second half cycles over one or more disk revolutions, or by averaging (or filtering) the anti-correlation measurement so as to reduce the chance of detecting false touchdown due to noise in the TD signal. However, in other embodiments the touchdown event may be detected over a single cycle of the periodic control signal in order to detect the touchdown event as soon as possible, thereby mitigating damage to the head.

In the embodiment shown in FIGS. 3A and 3B, the periodic control signal applied to the DFH actuator comprises a square wave with an adjustable DC offset. However, any suitable periodic control signal may be applied to the DFH actuator, such as a triangular or sinusoidal waveform. In another embodiment, the amplitude of the periodic control signal may be increased at block 48 of FIG. 2 instead of increasing the DC offset in order to detect a touchdown event. In this embodiment, the resulting change in the amplitude of the TD signal is accounted for when computing the anti-correlation.

In one embodiment, the TD signal is generated by periodically sampling the output of the TD sensor, such as by periodically measuring the voltage across the TD sensor. In this embodiment, the TD signal shown in FIGS. 3A and 3B would be represented as discrete data points rather than a continuous signal, and the anti-correlation computed in response to the discrete data points.

In the embodiment shown in FIG. 1B, the TD sensor 8 is fabricated with the head 2 separate from the read element 32. That is, the TD sensor 8 comprises a dedicated element for generating the TD signal. In another embodiment, the read element 32 may be used as the TD sensor for generating the TD signal as well as a sensor for generating a read signal (e.g., while reading the servo sectors during the touchdown calibration procedure). In one embodiment, the data sectors in one of the tracks 20 (FIG. 1A) may be erased (DC or AC) so that the effect of the magnetic field on the read element 32 is constant relative to the thermal response of the read element 32 during the touchdown calibration procedure. In this manner, the resulting TD signal generated by the read element 32 while over the data sectors will still exhibit a significant anti-correlation until the head contacts the disk.

Figure 5:
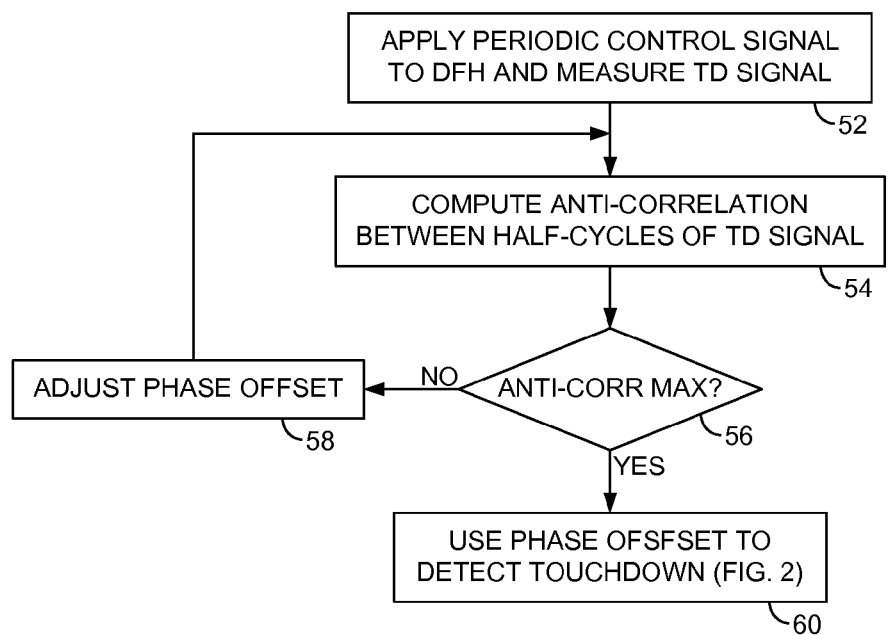
FIG. 5 is a flow diagram according to an embodiment of the present invention wherein a phase offset is calibrated between the periodic control signal and the TD signal.

In one embodiment, there may be a phase offset between the periodic control signal applied to the DFH actuator and the corresponding TD signal. This phase offset may be due, for example, to a latency in the control circuitry that measures the TD signal. FIG. 5 is a flow diagram according to an embodiment of the present invention wherein the phase offset between the periodic control signal and the TD signal is calibrated prior to executing the touchdown calibration procedure. The periodic control signal is applied to the DFH actuator and the resulting TD signal measured (block 52). An initial phase offset is used to determine the boundaries of the first and second half cycles of the TD signal relative to the periodic control signal. The anti-correlation between the first and second half cycles of the TD signal is then computed using the initial phase offset (block 54). If the resulting anti-correlation is not a maximum (block 56), the phase offset is adjusted (block 58) and the flow diagram repeated starting from step 54 until the anti-correlation is a maximum at block 56. The touchdown calibration procedure (FIG. 2) is then executed using the calibrated phase offset (block 60). Any suitable search algorithm may be employed to determine the phase offset that maximizes the anti-correlation, such as by detecting and following a gradient toward the optimal value.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk;
a head actuated over the disk;
a dynamic fly height (DFH) actuator operable to control a fly height of the head over the disk;
a touchdown (TD) sensor operable to generate a TD signal; and
control circuitry operable to:
apply a periodic control signal to the DFH actuator to generate a periodic response in the TD signal comprising at least one cycle, wherein the cycle comprises a first half cycle and a second half cycle;
compute an anti-correlation between the first half cycle and the second half cycle of the TD signal; and
detect the head contacting the disk in response to the anti-correlation.

2. The disk drive as recited in claim 1, wherein the TD signal represents a thermal response of the TD sensor.

3. The disk drive as recited in claim 1, wherein the at least one cycle comprises a plurality of cycles, the control circuitry is further operable to:
first average the first half cycles in the plurality of cycles and second average the second half cycles in the plurality of cycles; and
compute the anti-correlation between the first average and the second average.

4. The disk drive as recited in claim 1, wherein the control circuitry is further operable to incrementally increase a direct current (DC) offset of the periodic control signal until the head contacting the disk is detected.

5. The disk drive as recited in claim 1, wherein the control circuitry is further operable to detect the head contacting the disk when the anti-correlation falls below a threshold.

6. The disk drive as recited in claim 1, wherein the TD sensor comprises a magnetoresistive (MR) element.

7. The disk drive as recited in claim 6, wherein the control circuitry is further operable to bias the MR element with a direct current (DC) control signal when applying the periodic control signal.

8. The disk drive as recited in claim 1, wherein the control circuitry is further operable to calibrate a phase offset between the periodic control signal and the TD signal.

9. The disk drive as recited in claim 8, wherein the control circuitry is further operable to calibrate the phase offset by adjusting the phase offset until the anti-correlation is substantially maximum.

10. A method of operating a disk drive, the disk drive comprising a head actuated over a disk, a dynamic fly height (DFH) actuator operable to control a fly height of the head over the disk, and a touchdown (TD) sensor operable to generate a TD signal, the method comprising:
applying a periodic control signal to the DFH actuator to generate a periodic response in the TD signal comprising at least one cycle, wherein the cycle comprises a first half cycle and a second half cycle;
computing an anti-correlation between the first half cycle and the second half cycle of the TD signal; and
detecting the head contacting the disk in response to the anti-correlation.

11. The method as recited in claim 10, wherein the TD signal represents a thermal response of the TD sensor.

12. The method as recited in claim 10, wherein the at least one cycle comprises a plurality of cycles, the method further comprising:
first averaging the first half cycles in the plurality of cycles and second average the second half cycles in the plurality of cycles; and
computing the anti-correlation between the first average and the second average.

13. The method as recited in claim 10, further comprising incrementally increasing a direct current (DC) offset of the periodic control signal until the head contacting the disk is detected.

14. The method as recited in claim 10, further comprising detecting the head contacting the disk when the anti-correlation falls below a threshold.

15. The method as recited in claim 10, wherein the TD sensor comprises a magnetoresistive (MR) element.

16. The method as recited in claim 15, further comprising biasing the MR element with a direct current (DC) control signal when applying the periodic control signal.

17. The method as recited in claim 10, further comprising calibrating a phase offset between the periodic control signal and the TD signal.

18. The method as recited in claim 17, further comprising calibrating the phase offset by adjusting the phase offset until the anti-correlation is substantially maximum.

* * * * *